United States Patent [19]

Pater, Jr. et al.

[11] 4,187,434

[45] Feb. 5, 1980

[54] LONG LIFE RADIATION SHIELD FOR GAS TEMPERATURE MEASUREMENT

[75] Inventors: Frank R. Pater, Jr., Brackenridge; Joseph M. Kapusnik, Verona, both of Pa.

[73] Assignee: PPG Industries, Inc., Pittsburgh, Pa.

[21] Appl. No.: 938,627

[22] Filed: Aug. 31, 1978

[51] Int. Cl.² ............................................. G01K 13/00
[52] U.S. Cl. ...................................... 250/515; 73/349; 136/242
[58] Field of Search .................. 73/349, 359; 250/515; 136/231, 242, 230

[56] References Cited

U.S. PATENT DOCUMENTS

| | | | |
|---|---|---|---|
| 1,746,012 | 2/1930 | Schack | 73/349 |
| 1,773,825 | 8/1930 | Simms | 136/242 |
| 2,631,179 | 3/1953 | Bell | 136/230 |
| 2,698,990 | 1/1955 | Conant | 136/242 |
| 2,833,844 | 5/1958 | Burton | 73/349 |
| 3,398,027 | 8/1968 | Lajarrige | 136/242 |
| 4,038,105 | 7/1977 | Brandeberry | 73/349 |
| 4,060,095 | 11/1977 | Kurita | 136/242 |

Primary Examiner—S. Clement Swisher
Assistant Examiner—Denis E. Corr
Attorney, Agent, or Firm—Paul A. Leipold

[57] ABSTRACT

A suction pyrometer radiation shield comprising an elongated first alumina refractory tube, a series of smaller alumina refractory tubes arranged around and bonded to the inside surface of said first tube forming central passageway, an outer fracture resistant alumina refractory tube surrounding said first tube and an alumina refractory washer closely surrounding said first tube in abutting contact with said outer alumina refractory tube.

14 Claims, 4 Drawing Figures

LONG LIFE RADIATION SHIELD FOR GAS TEMPERATURE MEASUREMENT

BACKGROUND OF THE INVENTION

1. Field of the Invention

This invention generally relates to the measurement of temperatures and more particularly relates to heat shields for aspirating or suction pyrometers used in the measurement of high gas temperatures such as those encountered in glass melting furnaces.

2. Description of the Prior Art

It is desirable in the glass making industry to measure accurately the temperatures of the gases at different locations in the overall system of producing glass, particularly the gas temperatures in a melting furnace occuring at its ports, regenerators tunnels, flues, chimney and ejectors. Measured under actual operating conditions, the temperatures serve as bases for improvements in operations, modifications in design, and fuel and power savings. As a result, longer furnace life, higher tonnages, improved quality, and lower costs for the production of glass may be achieved.

In a conventional glass melting tank or furnace, fuel is alternately fired, using preheated combustion air, from one side and then the other through a series of ports along each side of the tank at right angles to the flow of molten glass. The raw materials are continually fed at one end of the tank and molten glass is removed from its other end. The variations and conditions at the various ports down each side of the tank are therefore important in determining the variations in temperature undergone by the raw materials during melting and the glass after melting.

In such glass melting furnace systems, the temperature of the combination air and exhaust gases may be substantially different from the temperature of the surrounding bodies, and the heat exchanged by radiation between the bodies and the temperature measuring instrument may predominate over that exchanged by convection. The exchange of heat by radiation from or to the adjacent bodies can influence the instrument reading so that it may indicate the temperature of such bodies or some temperature intermediate that of the bodies and the combustion air or exhaust gases rather than the true temperature of these gases.

Generally, in the above-mentioned environment a sheathed thermocouple is employed to measure the temperature of a gas. As is known, a thermocouple indicates its own temperature, and, if it is to determine that of a gas, its hot junction must attain the temperature of the gas. In the case of the sheathed thermocouple, the surface of the sheath receives heat from gas by convection. This heat then passes through the sheath to the hot junction of the thermocouple, but at the same time the sheath exchanges heat by radiation with the surrounding bodies and loses heat by conduction therealong. Hence, the temperature reached by the hot junction of the thermocouple may be different from the true temperature of the gas, particularly when temperatures above 1400° C. (2550° F.) are encountered.

Thus, in order to measure accurately temperatures of hot gases whose temperatures are different from those of their surroundings, aspirating pyrometers are conventionally employed. As is known, as aspirating pyrometer is an instrument wherein the convective heat transfer to a sheathed thermocouple from a gas is increased by drawing the gas over it at high velocity and at the same time shielding the thermocouple from heat radiating to or from the surrounding bodies so that the temperature of the hot junction of the thermocouple will be substantially the same as the temperature of the gas it is sensing.

In the past it has been proposed to construct a heat shield from standard thin wall refractory tubing. Generally speaking, this type of shield construction comprises a large diameter tube housing a series of small diameter tubes which are circumferentially arranged around and bonded to the inside surface of the larger tube.

In U.S. Pat. No. 4,038,105 it is illustrated a radiation shield for a pyrometer that comprises, as illustrated in FIG. 1 therein, a first tube having arranged circumferentially on the inside smaller tube for gas flow. This radiation shield is surface coated with a silicon carbide or other castable cement to provide protection against thermal shock and to seal the point of contact between the pyrometer shield and the cooled probe. The radiation shields are subject to great thermal shock as they are inserted into the furnace and withdrawn into ambient temperatures for insertion at a different point in the furnace.

There is a continuing problem with thermal shock breakage of the probe radiation shields which results in a loss of calibration, possible loss of the thermocouple operability, loss of time in replacement of the thermocouple and radiation shield and the costly loss of the radiation shields themselves. Therefore, there is a continuing need for a radiation shield possessing high resistance to thermal shock giving a long life. Further there is a need for a radiation shield of which will be less costly as it does not often have to be replaced necessitating both materials and labor costs. There is a need for a long life radiation shield that can be utilized for measuring temperatures up to 3200° F. and withdrawn into ambient temperature repeatedly.

SUMMARY OF THE INVENTION

It is an object of this invention to overcome disadvantages of prior radiation shields.

Another object of this invention is to form a radiation shield with long life.

An additional object of this invention is to provide accurate measurement of high temperature gases.

Another additional object of this invention is to provide a radiation shield construction that is resistant to thermal shock.

It is additionally an object of this invention to eliminate the need for surface cement on a radiation shield.

These and other objects of the invention are generally accomplished by providing a suction pyrometer radiation shield comprising a first alumina refractory tube, a series of smaller alumina refractory tubes arranged around and bonded to the inside surface of said first tube forming a central passageway, an outer fracture resistant alumina refractory tube surrounding said first tube and an alumina refractory washer closely surrounding said first tube in abutting contact with said outer alumina refractory tube. The washer is adopted to join with the flange of the water cooled probe on which the radiation shield is mounted.

In a preferred embodiment of the invention, both the first and outer alumina refractory tubes are a wall thickness of greater than ⅛ inch and are composed of greater than 99 percent pure alumina. The washer also is composed of greater than 99 percent pure alumina and has a thickness of greater than about a quarter inch.

DESCRIPTION OF THE PREFERRED EMBODIMENTS

Figure 1:
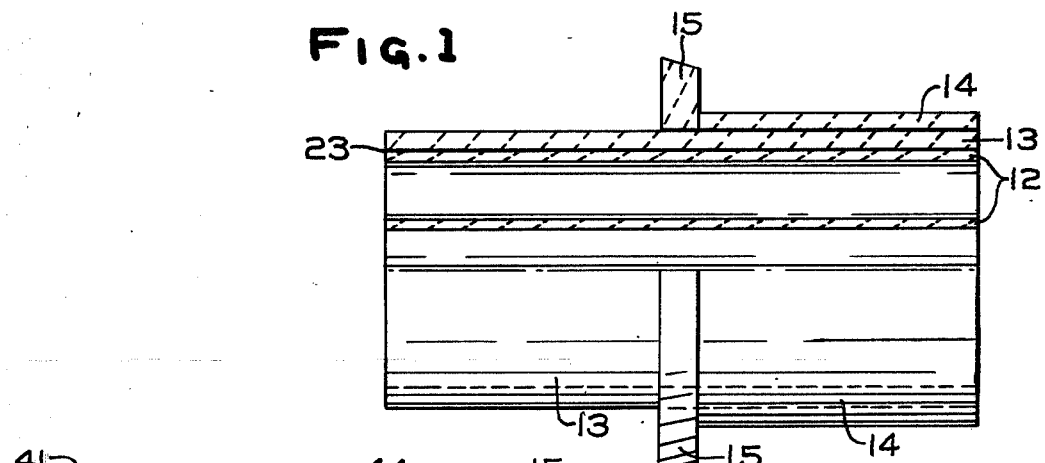
FIG. 1 is a fragmental elevation view with top half in cross section of a heat shield constructed in accordance with the invention.
Figure 2:
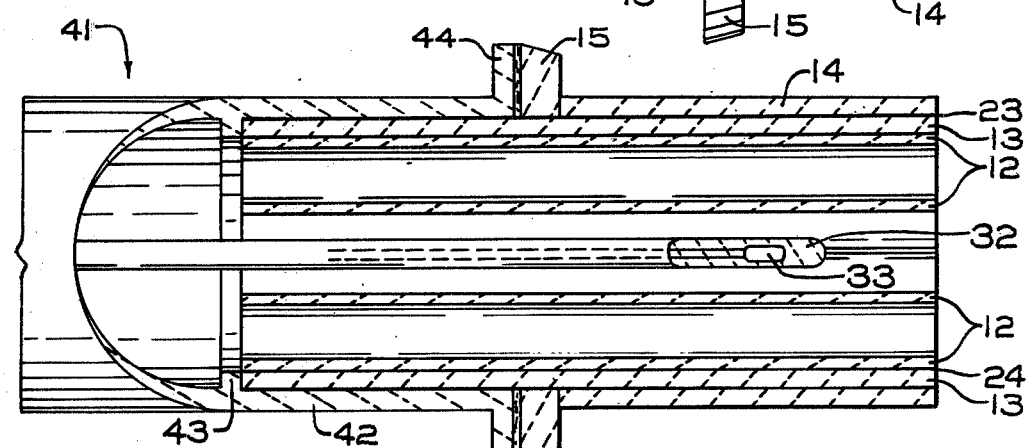
FIG. 2 is a fragmentary elevational view partly in cross section of a thermocouple, water cooled probe and the heat shield of the invention.
Figure 3:
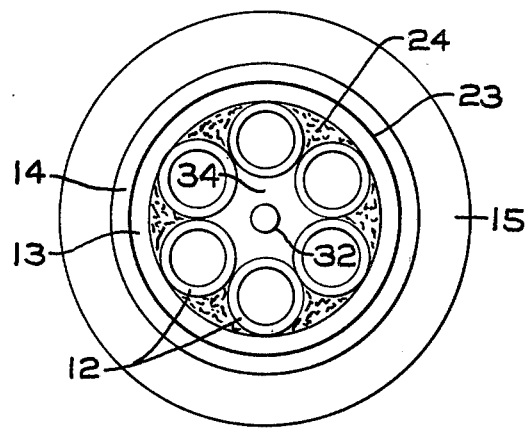
FIG. 3 is a perspective view of the end of the assembly of FIG. 2.

Referring to FIGS. 1, 2 and 3 a radiation shield of the invention is composed of a first tubular member 13. The first tubular member has circumferentially arranged around its inner portion a group of smaller alumina tubes 12 that are of such a size that they tightly fit to the inner surface of the first alumina cylindrical member and leave an open interior for placement of the thermocouple shield 32 which contains the thermocouple 33. The first tube 13 is closely surrounded by an outer thermal fracture resistant alumina tube 14 which is in abutting relationship with washer 15. Washer 15 is also closely in contact with the first tube 13. The interstice 23 between tubes 14 and 13 and interstices 24 between first tube 13 and the small inner tubes 12 are filled with refractory cement.

The washer 15 likewise has the interstices between the first tubular member 13 and the abutting contact of tubular member 14 filled with refractory cement.

In use the radiation shield of the invention is attached to the barrel of a water cooled probe generally indicated as 41. The probe is water cooled by normal means, not illustrated, so as to enable it to survive the high temperature environment in which the probe is utilized. The radiation shield is inserted into the end of the water cooled probe 42 such that it engages the flange of the probe 44 and is held by stop 43. The point of contact between the washer 15 and flange 44 also is coated with refractory cement 25. The thermocouple casing 32 is inserted the length of the probe into the radiation shield, but not extending to the end of the shield. The radiation shield conventionally extends about 3 inches beyond the flange 44. The small tubes 12 are open such that during operation gas passes through these tubes and in the space 34 between the thermocouple sheath 32 and the tubes 12. The gas is drawn by means not shown through the space 34 and through smaller tubes 12 to provide effective convective heat transfer to the measuring thermocouple 33. The alumina tubes block radiant energy from reaching the thermocouple sheath 32 so that accurate gas temperatures may be measured.

Figure 4:
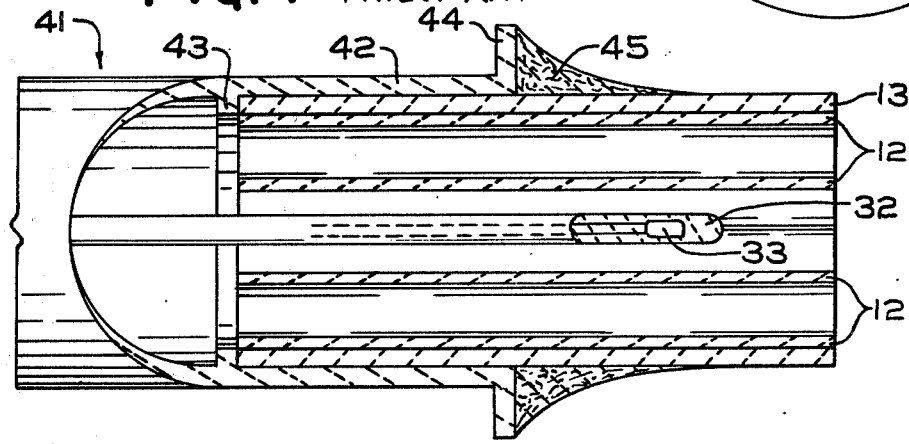
FIG. 4 is a fragmentary longitudinal sectional view partly in section of a thermocouple and heat shield assembly of the prior art.

In contrast to the construction of the radiation shield of the instant invention; FIG. 4 illustrates construction of a prior art radiation shield. This shield comprised first tube 13 having arranged around its inner periphery smaller tubes 12. This was mounted on the probe 41 by insertion to the stops 43. However, the prior radiation shield was generally connected to the flange 44 by refractory cement 45 as shown, although cement was sometimes extended to the end of the radiation shield. The refractory cement 45 was unable to resist the thermal shock and quickly broke away leading to early fracture of the radiation shield at the junction with the water cooled probe. The construction of the instant invention utilizing an outer alumina tubes and an alumina washer contacting the flange of the water cooled probe has proved to be of much longer life. As the longer life results in fewer replacements and less labor for replacement the cost is lower per measurement performed.

The radiation shield of the instant invention is constructed of alumina refractory tubes that are greater than 99 percent alumina. The first alumina tube of the invention and the outer alumina tube are preferably constructed of tubes having at least $\frac{1}{8}$ inch wall thickness. The preferred greater than $\frac{1}{8}$ inch wall thickness has been found to give longer life and be more resistant to thermal shock fractures. The small tubes surrounding the inside of the first tube are preferably at least $\frac{1}{8}$ inch in inside diameter and have a wall thickness of about 0.065 inches.

The thermal shock resistant alumina washer which joins the flange of the water cooled probe generally has a thickness of at least about $\frac{1}{4}$ inch. In a preferred embodiment the thickness of the washer is between about $\frac{1}{4}$ inch and $\frac{3}{8}$ inch. Thicker washers are of course possible, however the increased cost is not justified by a significant life increase.

Any refractory cement suitable for use at elevated temperatures of up to 3200 F. may be utilized between the alumina portions of the instant pyrometer. Among suitable cements are the castable phosphoric acid curing refractory cements. The "ACITAB" cements of Kaiser refractories are preferred members of the preferred refractory cements of alumina and magnesium. The refractory cement 23 may be forced into interstices between first tube 12 and outer tube 13 by cutting small grooves into the outer tube into which the cement is hydraulically forced. Refractory cements are known for use in joining portions of radiation heat shields and the use in interstices between the refractory portions of the instant radiation shield is in accordance with prior practice. However, it is preferred in the instant invention, and not believed common to the prior art, that the interstices between the first tube and the small inner tubes be entirely filled with refractory cement 24 for longer life expectancy of the radiation shield.

Radiation shields in accordance with the invention have been found to be about 5 times more durable than those such as illustrated in FIG. 4 and other prior shields. The radiation shields in accordance with the invention constructed of all alumina refractory and having the outer and inner tube greater than an $\frac{1}{8}$ inch thick and the washer having a thickness of greater than $\frac{1}{4}$ inch have been found to be able to have a life of about 600 minutes when inserted for 20 minute cycles at temperatures of between 2650° F. and 3200° F. This life of greater than 600 minutes compares with an average life of about 120 minutes under these conditions for prior art radiation shields of FIG. 4. Therefore, it can be seen that the radiation shield constructed in accordance with the instant invention is clearly superior and result in numerous advantages because of their long life.

Although this invention has been described with reference to particularly preferred embodiments, those skilled in the art will recognize that variations may be made in the practice of this invention without departing from the concepts disclosed here. For instance, the size of the inner tubes could be varied such that they are either all the same size or consisted of several different size tubular members. Accordingly, this disclosure is intended to be illustrative rather than limiting and the invention is defined by the claims following this disclosure.

We claim:
1. A suction pyrometer radiation shield comprising
   a. an elongated first alumina refractory tube
   b. a series of smaller alumina refractory tubes arranged around and bonded to the inside surface of said first tube forming a central passageway
   c. an outer fracture resistant alumina refractory tube surrounding said first tube
   d. an alumina refractory washer closely surrounding said first tube in abutting contact with said outer alumina refractory tube.
2. The shield of claim 1 wherein said alumina washer is located at about the middle of said first alumina tube.
3. The shield of claim 1 wherein said smaller alumina refractory tubes are all of substantially one size.
4. The shield of claim 1 wherein said smaller alumina refractory tubes are of more than one size.
5. The shield of claim 1 wherein interstices between said first alumina refractory tube and said smaller alumina refractory tubes are filled by refractory cement.
6. The shield of claim 1 wherein the interstices between said first alumina refractory tube and said outer refractory are filled by refractory cement.
7. The radiation shield of claim 1 wherein the interstices between said alumina refractory washer and said first tube and between said first tube and said outer refractory tube are filled by refractory cement.
8. The shield of claim 1 wherein said first alumina refractory tube has a wall thickness of at least about $\frac{1}{8}$ inch.
9. The shield of claim 1 wherein said smaller inner refractory tubes have a wall thickness of at least about 0.005 inches.
10. The radiation shield of claim 1 wherein said outer fracture resistant alumina refractory is a tube with a wall thickness of greater than about $\frac{1}{8}$ inch.
11. The shield of claim 10 wherein said washer has a thickness of greater than about $\frac{1}{4}$ inch.
12. The radiation shield of claim 1 wherein said washer has a thickness of greater than about a $\frac{1}{4}$ inch.
13. The shield of claim 1 wherein said washer has a thickness of between about $\frac{1}{4}$ inch and $\frac{3}{8}$ inch.
14. The radiation pyrometer shield of claim 1 wherein said washer is the same diameter as the flange of the water cooled probe with which it is used.

* * * * *